US 6,776,433 B2
Aug. 17, 2004

(12) United States Patent
Harrison et al.

(54) ASSISTIVE MOBILITY DEVICE

(76) Inventors: Richard J. Harrison, 8 Spring Meadow La., Hockessin, DE (US) 19707; William F. Mann, 19 Healey Pl., Avondale, PA (US) 19311

( * ) Notice: Subject to any disclaimer, the term of this patent is extended or adjusted under 35 U.S.C. 154(b) by 0 days.

(21) Appl. No.: 10/014,125

(22) Filed: Dec. 11, 2001

(65) Prior Publication Data
US 2002/0084627 A1 Jul. 4, 2002

Related U.S. Application Data

(63) Continuation-in-part of application No. 09/642,948, filed on Aug. 22, 2000.

(51) Int. Cl.⁷ .................................................. A47C 4/28
(52) U.S. Cl. ........................ 280/647; 280/649; 280/650; 297/16.2
(58) Field of Search ................................. 280/642, 643, 280/644, 647, 649, 650, 87.05; 297/16.1, 16.2, 3, 94

(56) References Cited

U.S. PATENT DOCUMENTS

| | | | |
|---|---|---|---|
| 4,052,087 A | 10/1977 | Gagliardi | |
| 4,632,409 A | 12/1986 | Hall et al. | |
| 4,685,725 A | 8/1987 | Helfrich | |
| 4,861,056 A | 8/1989 | Duffey, Jr. et al. | |
| 5,076,390 A | 12/1991 | Haskin | |
| 5,154,438 A | 10/1992 | Berclay | |
| 5,290,050 A | * 3/1994 | Kim | 280/42 |
| 5,560,627 A | 10/1996 | Zatulovsky | |
| 5,560,636 A | 10/1996 | Chen | |
| 5,568,933 A | * 10/1996 | Mizuno | 280/42 |
| 5,741,020 A | 4/1998 | Harroun | |
| 5,857,688 A | 1/1999 | Swearingen | |
| 5,884,928 A | 3/1999 | Papac | |
| 5,984,406 A | 11/1999 | Lee | |
| 6,027,132 A | 2/2000 | Robinson et al. | |
| 6,045,177 A | 4/2000 | Grace | |
| 6,082,813 A | 7/2000 | Chen | |
| 6,113,181 A | * 9/2000 | Tang | 297/27 |
| 6,149,238 A | 11/2000 | Tsai | |
| 6,155,579 A | * 12/2000 | Eyman et al. | 280/30 |
| 6,209,951 B1 | 4/2001 | Han | |
| 6,231,119 B1 | * 5/2001 | Zheng | 297/16.2 |
| 6,247,748 B1 | 6/2001 | Zeng | |
| 6,247,749 B1 | 6/2001 | Yu | |
| 6,264,271 B1 | 7/2001 | Munn et al. | |
| 6,354,619 B1 | * 3/2002 | Kim | 280/651 |
| 6,428,033 B1 | 8/2002 | Harrison | |

\* cited by examiner

Primary Examiner—Bryan Fischmann
Assistant Examiner—Christopher Bottorff

(57) ABSTRACT

The present invention is a portable chair with caster wheels that is lightweight in construction and easily collapsed, carried, stored and transported by public or private means. The chair can be configured as an assistive mobility device to fill the unmet needs of aging healthy adults who wish to retain their independence and social interactions. It can also be configured as a collapsible office chair to meet the needs of employers with temporary working staff and for use by college students in crowded dorm rooms. Additional features such as an armrest, a foot rest, or a reclining back are easily added during manufacture and because of the chairs uncomplicated design and duplicity of parts, it is very economical to manufacture.

26 Claims, 11 Drawing Sheets

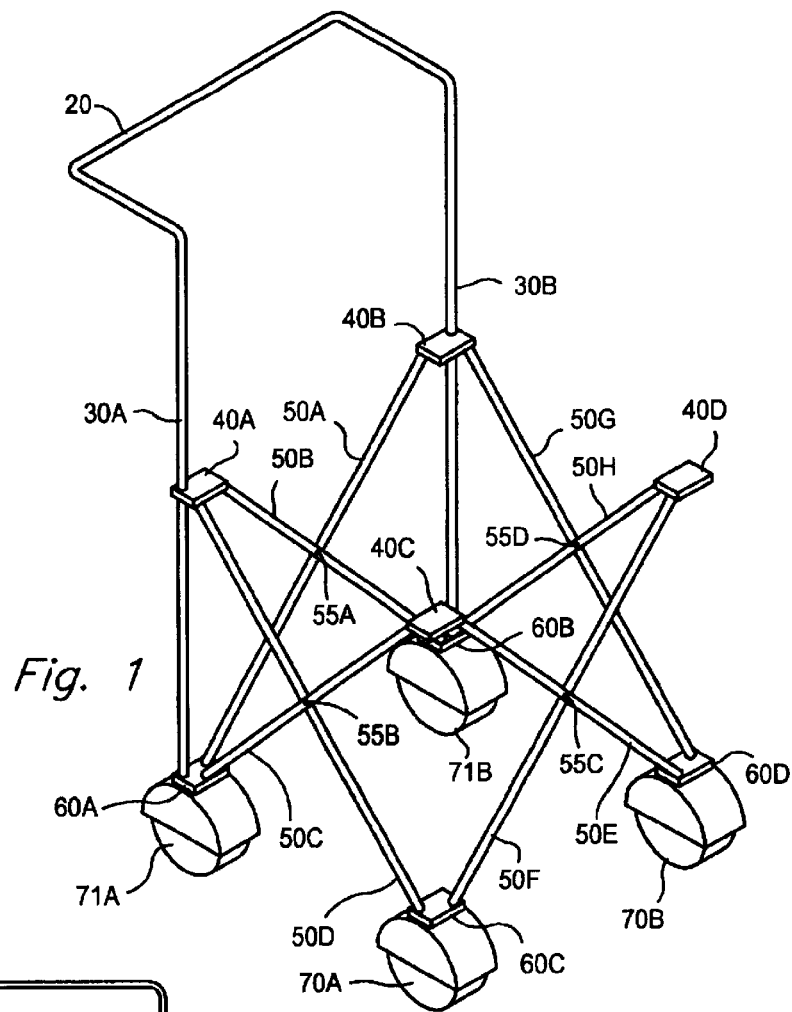
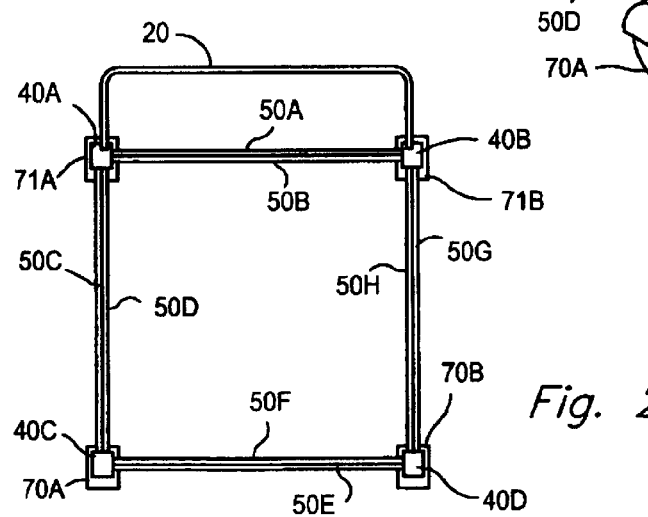
Fig. 1
Fig. 2

ASSISTIVE MOBILITY DEVICE

CROSS REFERENCE TO RELATED APPLICATION

This application is a continuation-in-part of U.S. patent application Ser. No. 09/642,948 filed on Aug. 22, 2000.

FIELD OF THE INVENTION

The present invention is a portable chair with wheels that is lightweight in construction and easily collapsed, carried, stored and transported by public or private means. The chair can be configured as an assistive mobility device to meet the needs of aging healthy adults or as a collapsible office chair. Moreover, the present invention is economical to manufacture due to its simplicity of materials, uncomplicated design and duplication of parts.

BACKGROUND OF THE INVENTION

Wheelchairs are a type of assistive mobility device. Traditionally, wheelchairs have been designed to facilitate patient transport for the medically infirmed. In meeting the needs of medical patients, the wheelchair has evolved into a classic styling that is easily recognized and most often associated with medically disabled or invalid patients. This easy recognition has created a stigma for those who use a wheelchair. Because of this stigma, many aging adults that would benefit from using a wheelchair limit their activities and social interactions rather than being branded as an invalid. The basic concept of the invention is to provide mobility in a way that does not stereotype the user as being disabled or invalid.

Americans are living longer with life expectancy increasing annually (76.5 years for 1997 versus 76.1 years for 1996) according to the federal center for Disease Control and Prevention. In addition, Americans 65 years and older represent the segment of U.S. population that is the fastest growing according to the U.S. Bureau of the Census. The impact this older adult segment will have on our healthcare system is inevitable in the future. So is the need and desire to extend the independence of older Americans.

Significant research has been conducted on older persons on the impact of reduced activities and social interactions on their wellness. These include studies by individual researchers and large scale studies such as the National Survey of Self Care and Aging, National Health Interview Survey, National Long-term Care Survey, and the Canadian Health and Activity Limitation Survey. The results of these studies provide conclusive proof that wellness and the quality of life of healthy older Americans is improved by extending their independence and social interactions.

Portable wheelchairs, a type of assistive mobility device, capable of folding or collapsing have been in use for many years to accommodate wheelchair users who travel and need to take their wheelchairs with them. Typically, the wheelchairs that are designed to fold or collapse incorporate a pair of diagonally extending cross members secured between a right and left frame member which may be scissored together to collapse the wheelchair. Standard cross member frame construction for portable wheelchairs is bulky and heavy, making transport or storage difficult at best. Consequently, portable wheelchairs are not designed for storage in standard carry-on luggage compartments such as on airlines, trains and other mass transit mediums. Other folding wheelchair designs such as those which fold around a center pole or those which fold with the backrest collapsing forward have the same problems.

Additionally, portable wheelchairs, although light versus a standard wheelchair, are heavy and awkward for older persons to lift and load into automotive vehicles such as cars, vans and taxis.

U.S. Pat. No. 5,857,688 to Swearingen, U.S. Pat. No. 5,560,627 to Zatulovsky et al, U.S. Pat No. 4,861,056 to Duffey, Jr. et al, and U.S. Pat. No. 5,154,438 to Barclay are examples of prior art that incorporate various cross member support structures for a portable wheelchair.

The X crossed support arm frame structure of the invention is prior art and well known in the seating industry. The frame structure has been used for many years by the manufacturers of chairs for sporting events, camping, and fishing. Currently marketed examples of the frame structure include the folding Deluxe Quad Chair sold by Kmart Stores under the Northwest Territory brand name (bar code 72000752175—stock number 888072-113) and the Sir Edmund Hillary Folding Lounge Chair with footrest sold by Sears Roebuck & Company (bar code 27001728299—stock number 72829).

Therefore, there is a need in the art that appreciates the need of older adults who are not necessarily invalids to have an assistive mobility device that provides the means for easy participation in activities and social interactions without the wheelchair stigma. This specification describes an invention that will provide a mobility means that has the potential to extend the independence, quality of life and social interactions of the millions of aging Americans. Additionally, the present invention provides a solution to the needs for a lightweight, easily collapsible, portable, and storable assistive mobility device.

The invention also fills the unmet needs of another population of people, temporary office workers. Many employers today hire office workers for short periods of time. As the employers' space is often limited and the need for seating is temporary, the employer may use folding tables and chairs as a means of providing the temporary workers with a work space. Use of folding chairs avoids the investment in office chairs, which will be a storage problem when they are no longer required. Folding chairs do, however, have significant disadvantages to the employer and the temporary workers. Folding chairs are uncomfortable to sit on for extended periods of time and lack the mobility for which rolling office chairs were invented. Therefore, there is a need in the art for which the present invention provides a solution while maintaining the easy storage associated with folding chairs.

SUMMARY OF THE INVENTION

Therefore, the object of the present invention is to present a compact, collapsible, assistive mobility device that provides the means for aging adults to participate in activities and social interactions without the wheelchair stigma. The invention accomplishes this by creating a new design appearance for an assistive mobility device. The design incorporates prior art from the frame of a chair originally designed as a camping backpacking or sports chair with the addition of caster wheels thus eliminating the large drive wheels and bulky frame normally associated with wheelchairs. Moreover, the preferred embodiment of the invention replaces the two traditional push handles with a collapsible push-bar which further strengthens the frame and alters the assistive mobility device's appearance. In addition, the typical wheelchair's two-piece fabric back and seat are replaced by a single piece of fabric in the preferred embodiment of the invention. This further alters the appearance of the assistive mobility device.

It is another object of the present invention to provide a new frame construction design. Whereas, most assistive mobility devices to date have collapsed by bringing the two opposing sides together, and a few have folded front to back or around a center pole. None have had a four-sided frame that simultaneously collapsed inwardly in both the front to back and side to side directions. This creates a significant advantage in the compact size that results when the assistive mobility device is collapsed.

It is yet another advantage of the present invention to provide a compact collapsible assistive mobility device that has a significant number of parts which are identical for economical construction. In the preferred embodiment of the invention at least six of the seat support arms, four upper corner brackets, two front caster wheels and associated corner brackets, two back caster wheels and associated corner brackets and two back rest supports are interchangeable.

It is yet another advantage of the present invention to provide an adjustable footrest which is also collapsible.

It is yet another advantage of the present invention to provide an adjustable backrest.

In a preferred embodiment of the invention, the assistive mobility device has four removable casters wheels with the back caster wheels fixed to roll in the direction which the assistive mobility device faces and the front caster wheels free to rotate 360° for improved maneuverability. Moreover, the front caster wheels also have a brake to lock the assistive mobility device in a fixed location during the mounting and dismounting of the device.

It is yet another advantage of the present invention to provide a flexible carrying case for the assistive mobility device. In the preferred embodiment of the invention, the case has pockets for storage of the removable caster wheels and a shoulder strap for easy manual transport.

It is yet another advantage of the present invention to provide a collapsed assistive mobility device which will fit easily into the luggage compartment or storage areas of mass transit vehicles and the back seat or trunk of most automobiles.

It is yet another advantage of the present invention to provide a mobile, comfortable and collapsible office chair.

These and further objects, features and advantages of the present invention will become apparent from the foregoing detailed description, wherein reference is made to figures and the accompanying drawings.

BRIEF DESCRIPTION OF THE DRAWINGS

FIG. 1 is a perspective view of the basic assistive mobility device frame with casters 70A, 70B, 71A and 71B attached and without a seat and back means 100 illustrated.

FIG. 2 is a top view of the mobility device frame shown in FIG. 1 with casters 70A, 70B, 71A and 71B attached and without a seat and back means 100.

DETAILED DESCRIPTION OF THE DISCLOSURE

In this application, certain references numerals appearing in the Parent Application have been replace in the Specification and drawings by more specific numerals and in some cases, related text.

Figure 3:
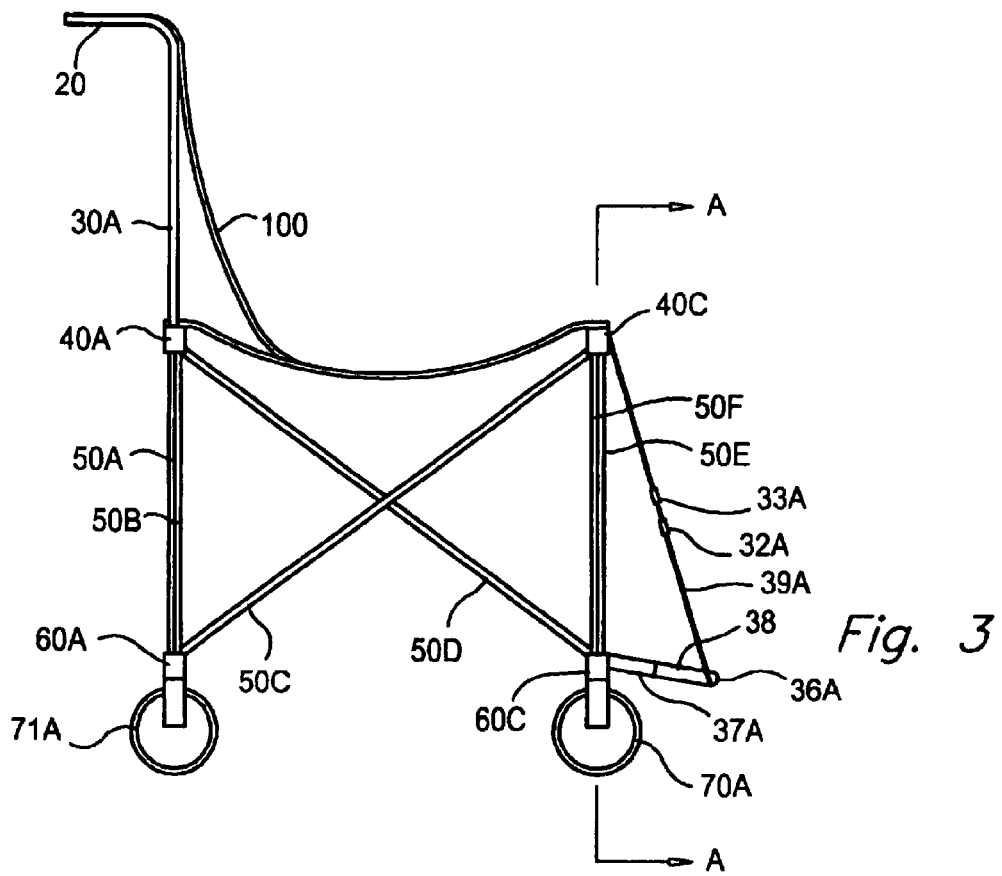
FIG. 3 is a side view of the basic assistive mobility device frame in its normally open position with a seat and back means.

Referring now to the drawings, it is seen that a preferred embodiment of the assistive mobility device of the present invention, as illustrated in FIG. 1 and FIG. 2 without a seat and back means is comprised of a four-sided frame having two (2) seat support arms 50A and 50B, 50C and 50D, 50E and 50F and 50G and 50H per side, four (4) upper corner brackets 40A, 40B, 40C, and 40D, four (4) lower corner brackets 60A, 60B, 60C and 60D, two (2) vertical back rest posts 30A and 30B, a push bar 20, and four (4) removable casters 70A, 70B, 71A and 71B, FIG. 3 is a side view of a preferred embodiment with a flexible one piece backrest and seat means 100 shown. The backrest and seat means 100 are attached at the upper corner brackets 40A, 40B, 40C and 40D and to the back rest posts 30A and 30B. The vertical back rest posts 30A and 30B are secured to the rear lower corner brackets 60A and 60B and slide freely through the upper rear corner brackets 40A and 40B as the assistive mobility device is opened and closed.

In a preferred embodiment of the invention shown in FIGS. 1 and 2, the front casters 70A and 70B can rotate 360°. They are attached to the lower support arm corner brackets 60C and 60D so as to be easily removable when the assistive mobility device is compacted for transit. The rear casters 71A and 71B are locked in a position allowing for movement in the direction the assistive device is facing. An optional caster locking brake, not shown, is located on each caster 70A and 70B.

Figure 4:
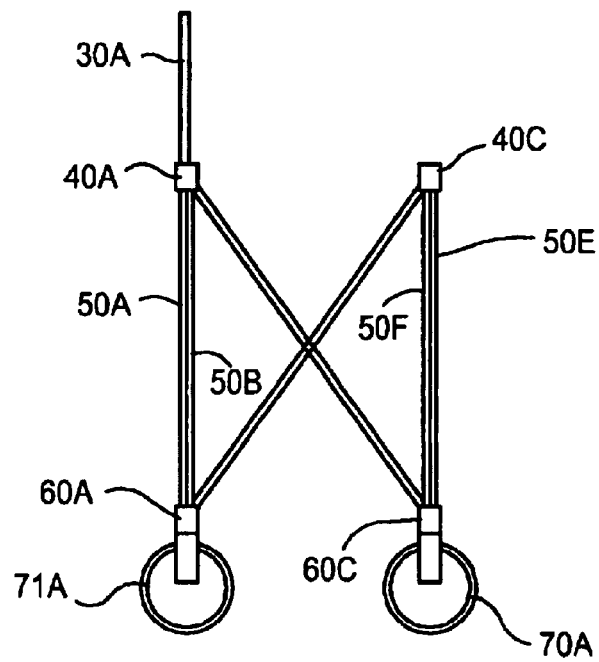
FIG. 4 is a side view of the basic assistive mobility device frame in a partially closed position without a push bar 20 and seat and back means 100.

In a preferred embodiment of the invention of FIGS. 1 and 2, the length of the seat support arms 50A, 50B, 50C, 50D, 50E, 50F, 50G, and 50H between the upper seat support arm brackets 40A, 40B, 40C, and 40D and the opposing lower seat arm support brackets 60A, 60B, 60C, and 60D is the same. In a preferred embodiment of the invention the seat support arms 50A and 50B, 50C and 50D, 50E and 50F, and 50G and 50H bisect each other forming a symmetrical frame. Seat support arms 50A and 50B, 50C and 50D, 50E and 50F, and 50G and 50H on each side of the fame are joined at the point of intersection with a swivel fitting or pin 55A, 55B, 55C and 55D which permits the seat support arms 50A and 50B, 50C and 50D, 50E and 50F, and 50G and 50H to move from an essentially parallel position when the assistive mobility device is closed, to a crossed position when in the open or sifting position. In addition, one end of each seat support arm is connected to an upper corner bracket 40A, 40B, 40C, and 40D by a swivel fitting and the opposite end of each arm is connected to a lower corner bracket by a swivel fitting. FIG. 4 illustrates a side view of the assistive mobility device frame in a partially closed position without push bar 20 and seat and back means 100.

Figure 5:
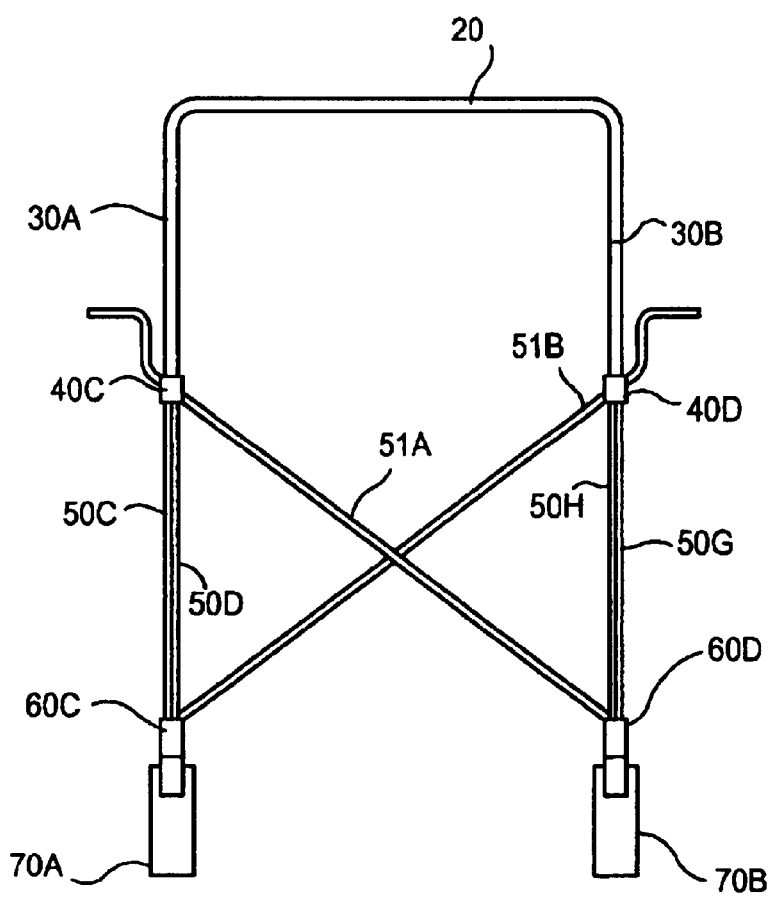
FIG. 5 is a front view of the assistive mobility device frame with casters and extended front seat support arm use to create an armrest frame shown without a seat and back means.

In another embodiment of the invention, the front two seat support arms 50E and 50F that extend across the front of the frame from the lower front corner brackets 60C and 60D to the upper front brackets 40C and 40D are replaced by two seat support arms 51A and 51B which extend above the upper front corner brackets 40C and 40D. The extensions 51A and 51B seat support arms 50C and 50D are bent above the upper corner brackets 40C and 40D to form the support frame for the armrests, as illustrated in FIG. 5. The armrest is created by a flexible fabric material which is attached or mounted on the seat support arm 51A and 51B and extends toward the back of the chair to form an essentially horizontal armrest for the assistive mobility device occupant.

In a preferred embodiment of the invention, the assistive mobility device has a removable push bar 20 that mounts on the two backrest support arms 30A and 30B. The push bar 20 has a fixed width that provides additional frame stability versus individual handles when the assistive mobility device is in its seating configuration.

Figure 3A:
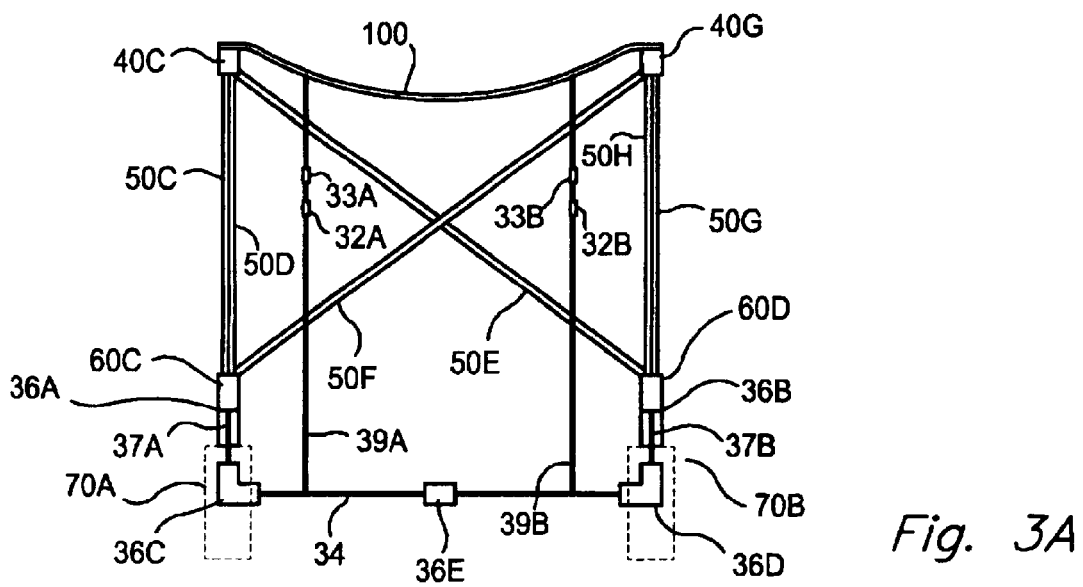
FIG. 3A is a cross section A→A in FIG. 3.

In a preferred embodiment of the invention, as shown in FIGS. 3 and 3A, the assistive mobility device also has an adjustable foot 38 comprised of two telescoping hinged foot rest support arms 37A and 37B extending away from the front lower corner brackets 60C and 60D. The hinges are 36A and 36B. The outward ends of the leg rest support arms 37A and 37B are attached through hinges 36C and 36D to a leg rest support cross member 34. The footrest support cross member 34 is also hinged in the middle as at 36E thus allowing the two footrest support arms 37A and 37B and the foot rest support cross member 34 to become essentially parallel when the assistive mobility device is closed. The footrest is held at the desired height off the ground by a pair of support straps 39A and 39B which are attached to the seat and back rest means 100 and to the foot rest cross member 34. Said support straps 39A and 39B have a means 32A and 32B for shortening or lengthening and a means for disconnecting 33A and 33B and connecting. Such means may be of any suitable type, including buckles, Velcro straps. By adjusting the length of the telescoping leg rest support arms 37A and 37B and the length of the support straps 39A and 39B, the assistive mobility device can be configured to comfortably fit different size occupants. The ability to disconnect the support straps 39A and 39B permits easy chair access.

Figure 6A:
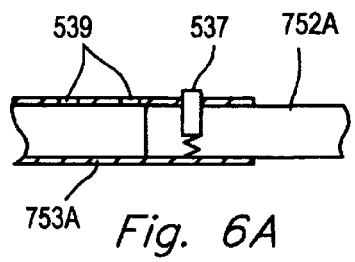
FIG. 6A illustrates telescoping assembly for backrest adjustment.
Figure 6B:
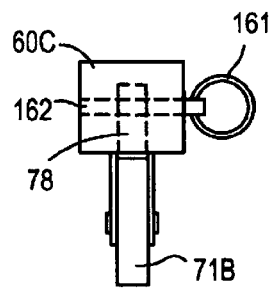
FIG. 6B perspective view of lower corner bracket, mounting pin, and caster assemby.
Figure 6:
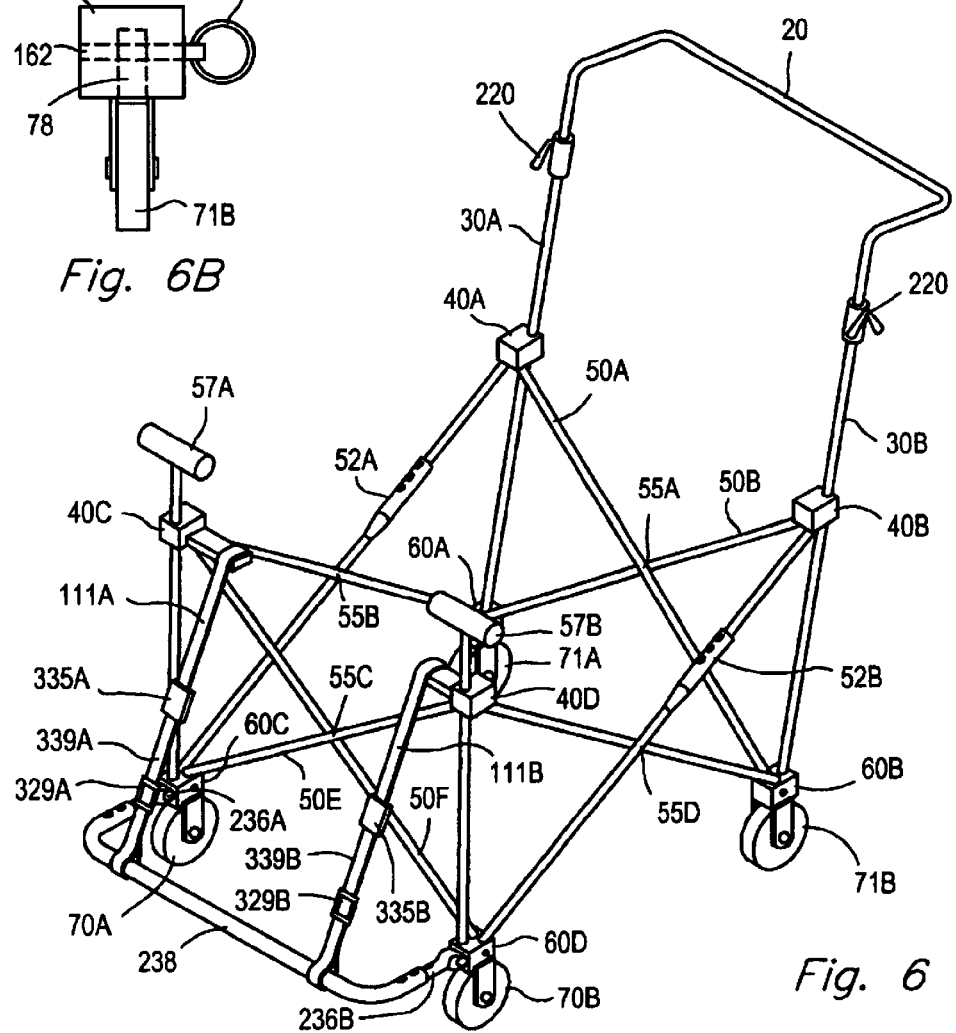
FIG. 6 is a perspective view of the assistive mobility device frame with casters and an adjustable back shown in a slightly reclined position shown without a seat and back means 100.

In yet another embodiment of the assistive mobility device as shown in FIG. 6, the seat support arms 50D and 50G which extend from the lower front left and right lower corner brackets 60C and 60D to their respective upper left and right corner brackets 40A and 40B as shown in FIG. 1, are replaced with locking telescoping seat support arm brackets 52A and 52B. Thus by extending or shorting the length of the telescoping seat support arms 52A and 52B, one can change the back rest angle for the occupant. FIG. 6A illustrates the telescoping portion of 52A. The assembly consists of an outer tube 753A that incorporates a number of holes 539 into which a push button locking and release clip 537 can be inserted to adjust the length of seat support arm 52A. A second smaller tube 752A slides inside the outer tube 753A. A push button lock and release clip 539 is mounted inside the second smaller tube 752A. Thus, by depressing the push button lock and release clip and sliding the tubes together or apart to a point where the push button lock and release clip 537 can be engaged in a hole 539 in the outer tube 753, the length of seat support arm 52A is adjusted which in turn changes the angle of recline of backrest post 30A. The seat means 100 is also adjustable to accommodate different backrest positions.

In all preferred embodiments of the invention the frame is made using a lightweight material such as aluminum, a high-strength composite, or an engineering grade of plastic. The footrest support straps 39A and 39B are made of a nylon web belting having a quick-release buckle and the combination seat and back means 100 are made of a strong flexible material such as a durable, high-strength, nylon canvas fabric.

In a preferred embodiment of the invention, the assistive mobility device also includes a flexible carrying case. The case includes pockets for the casters and a shoulder strap.

With respect to casters and brakes, it was anticipated that the preferred embodiment would have brakes located on the front swivel casters, such as 70A and 70B, (FIG. 1). It was found that although having brakes on the front casters may be desirable under some circumstances, in general the preferred location for brakes is on the rear casters, such as 71A and 71B, (FIG. 1).

Figure 9:
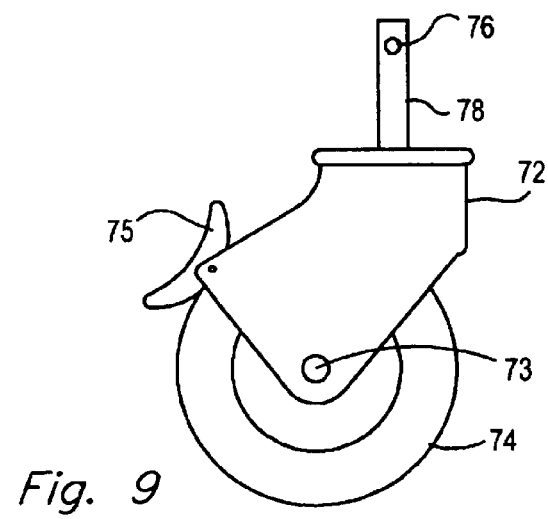
FIG. 9 is a side view of a caster body with brake lever.

A swivel caster, FIG. 9, tracks with its axle 73 following its stem 78. Preferably, the caster includes a friction tread locking brake assembly mounted aft of the axle. This type of brake locks the caster wheel 74 when the brake lever 75 is moved into a locking position. Thus, when such a tread locking brake is used for the front swivel casters, such as 70A and 70B, (FIG. 1) of the assistive mobility device. The brake lever 75 will generally end up directly under the assistive mobility device requiring the operator to walk from side to side to set or release the brakes or even worse, one caster's brake levers 75 will end up under the device, thus requiring the operator not only to walk around the device to engage and release the brakes but perhaps be required to move the device with one of the brakes still engaged. Locating the brakes 75 on the rear rigid casters, 71A and 71B, (FIG. 1), permits the operator to engage both left and right rear casters without having to walk around the device.

Rigid casters generally have their mounting stem or bracket centered directly over their axle. To improve tipping stability we have worked with caster manufacturers to design a fixed direction rigid caster using a swivel/rotational caster body design as shown in FIG. 9. This caster is the preferred embodiment of the mobility device of this invention because it increases the wheelbase and improves stability.

Three different types of caster brakes including cam style friction brakes mounted to the caster axle 73 (not shown), spoke locking gear brakes (not shown) and tread locking brakes mounted on the caster horn 72 (FIG. 9) were evaluated. The preferred embodiment is the tread locking brake assembly which is easier to install and use than the spoke locking gear brakes and exhibits significantly greater holding power than the cam style friction brakes.

Mounting the brake assemblies on the assistive mobility device frame versus on the caster wheel was also evaluated. Although it was determined that it is possible to mount brake assemblies on or in the assistive mobility device's backrest posts, 30A and 30B, or on the lower rear corner brackets 60A and 60B (FIG. 1). A tread locking brake assembly mounted on the caster horn 72 is preferred because they are less expensive and easier to maintain.

Furthermore, it was determined that the preferred material of construction for the caster horn 72 (FIG. 9) and the caster wheel 74 (FIG. 9) is of a polymeric composition. Traditionally the horn 72 (FIG. 9) and parts of the caster wheel 74 (FIG. 9) have been made from metallic materials. The polymeric compositions are the preferred embodiment because they are in general, lighter in weight, less susceptible to corrosion, and more ergonomically appealing.

The diameter of the caster wheel 74 (FIG. 9) is very important. These casters wheels must be large enough to easily traverse many types of surfaces such as carpet, pavement, tile, concrete etc., yet excess diameter must be limited to permit a compact folding and easy transport of the chair. We have found that said caster wheel diameters in the range of about 3" to 10" are acceptable with the preferred embodiment being in the 5" to 6" diameter range.

In known fixed attachment systems, casters can be mounted in vertical posts such as the vertical rear support posts, 30A and 30B (FIG. 1). Alternatively, casters can be mounted to the lower corner brackets, 60A, 60B, 60C, and 60D, (FIG. 1).

In the absence of vertical posts as is the case for the front corners of in the chair configuration shown in FIG. 1, corner bracket mounting is required. The preferred means for caster attachment to the chair frame (as opposed to in the posts) is a quick connect and disconnect attachment system as illustrated in FIG. 6B. As illustrated, each corner bracket has an opening into which the caster's stem 78 slides. The caster is attached to the corner bracket by a removable pin 161 which slides through a prebored hole in the corner bracket 162 and through a prebored hole in the caster stem 76 (see FIG. 9). Thus, each caster can be rapidly locked into the corner bracket 60 by inserting the pin 161 as described or unlocked when the pin 161 is removed, thereby providing a quick connect means.

In yet another embodiment, telescoping anti torque posts 35A and 35B (FIG. 10) are added to the frame assembly to keep the front upper brackets, 40C and 40D, and the front lower brackets, 60C and 60D, in vertical alignment. Unlike "X" sided folding chairs whose support arms have relatively small angles above and below their point of intersection. The addition of casters to the mobility device significantly increases the angles above and below the support arms point of intersection because the distance between the upper corner brackets, 40A, 40B, 40C, and 40D, and lower corner brackets, 60A, 60B, 60C and 60D, is reduced.

Thus, as the top and bottom portions of the intersecting support arms are being spread wider to maintain the same seat height the top and bottom intersecting angles are increased. This increase in intersecting angles would not necessarily be a problem with a chair sitting on a flat surface where mass and friction will work to keep the lower corner brackets flat as they rest against the ground. It is, however, a significant problem when the chair is on casters so that the corner brackets are no longer in contact with the ground.

The increased angle creates increased torque on the upper front brackets, 40C and 40D, and lower front brackets, 60C and 60D, causing them to rotate out of their normal vertical alignment and results in the casters support being forced outward whereby the caster wheels are at an angle to the ground, whereby they can not roll properly. As illustrated in FIG. 10A lower front corner brackets 60C and 60D that support caster 70A and 70B are forced from the vertical by the torque action described so that the wheels 70A and 70B are also forced to an angle relative to the ground thus rendering the mobility device inoperable. Additionally, the twisting tears the seat fabric 100.

Figure 10:
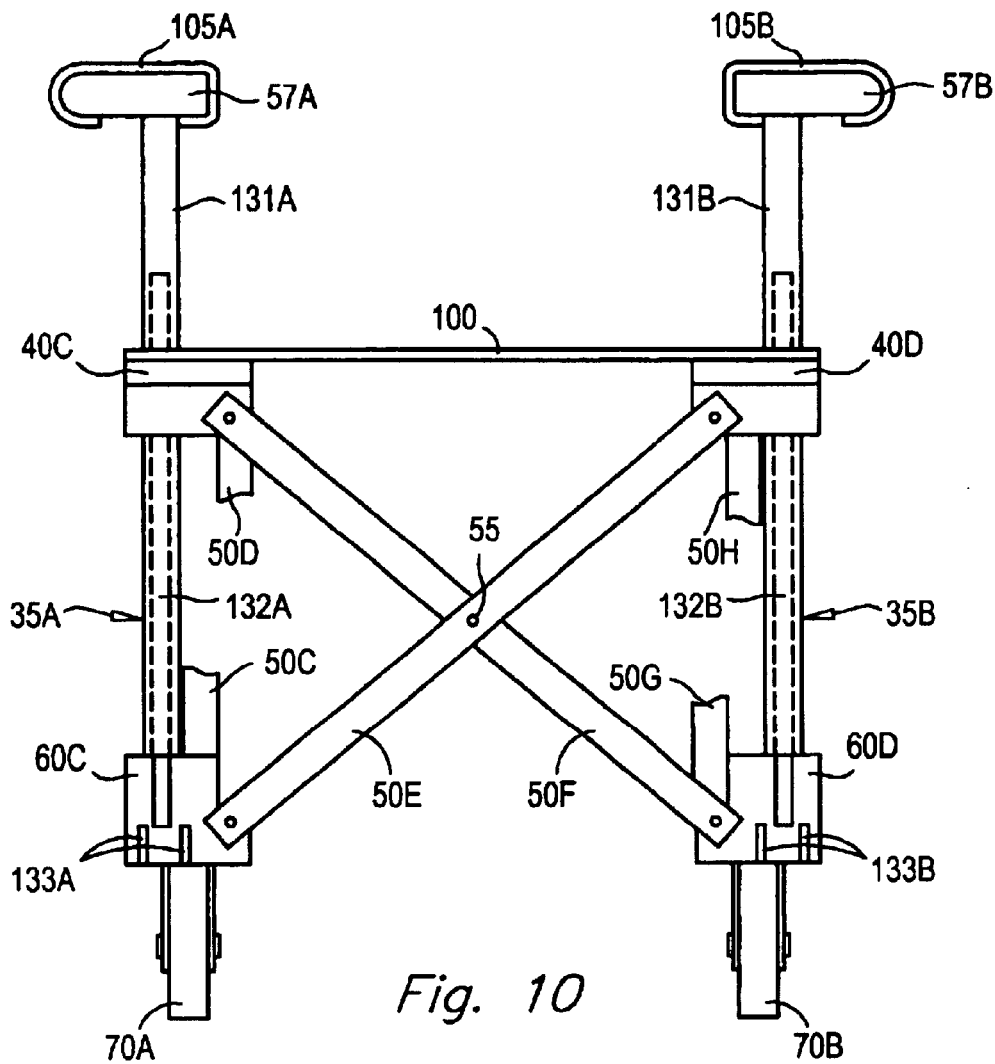
FIG. 10 is a cross section view of the front of FIG. 13 illustrating the anti torque posts.
Figure 10A:
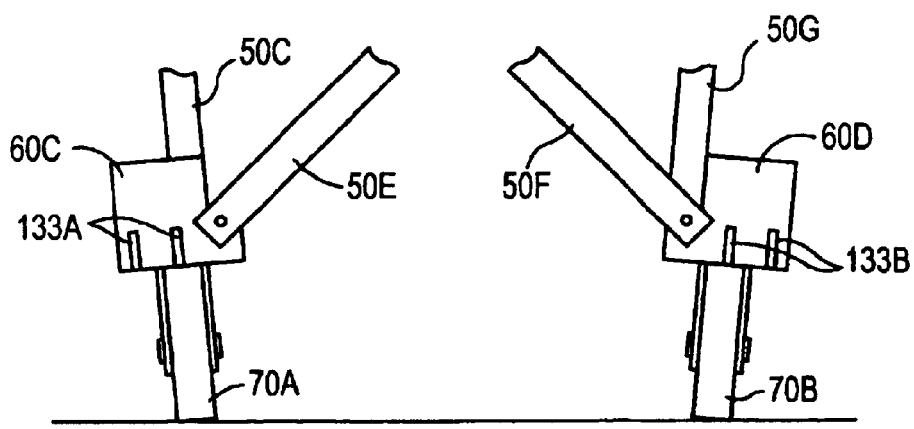
FIG. 10A represents caster failure mode without anti torque posts.

The solution for this problem is the addition of anti torque arms, as shown in FIG. 10, which is a front cross sectional view of the assistive mobility device. In this embodiment, two telescoping vertically aligned anti torque posts, 35A and 35B, are comprised of lower posts, 132A and 132B attached to the two lower front corner brackets 60C and 60D. A second set of hollow slidable posts 131A and 131B are positioned over lower posts 132A and 132B. In one version of the invention the upper ends of 132A and 132B are connected the upper front corner brackets 40C and 40D and in a preferred embodiment of the invention, the upper posts 131A and 131B extend through the upper front corner brackets 40C and 40D and are slidable within those brackets, as shown in FIG. 10.

Thus, the upper portion of the anti torque posts, 131A and 131B, are slidable through upper front corner brackets, 40C and 40D, and telescopically slide over the lower posts, 132A and 132B, during folding and unfolding of the assistive mobility device. In fact, posts 131A and 131B slide over smaller internal posts 132A and 132B thereby making it possible to fully collapse the chair.

The system shown in FIG. 10 solves the caster twisting technical problem by preventing such torque distortion. This is accomplished by adding vertical telescoping anti torque posts assemblies 35A and 35B that keep the upper and lower front corner brackets 40C and 40D and 60C and 60D in vertical alignment. In turn, this is because the torque forces are less than the vertical force of anti torque posts 35A and 35B. In essence, the anti torque functionality of this invention is provided by front posts 35A and 35B.

As illustrated in FIG. 10, the lower end of posts, 131A and 131B, are supported by the lower front corner brackets 60C and 60D.

In one embodiment, hand grips 57A and 57B are attached to the upper ends of the telescoping anti torque posts, 131A and 131B. These hand grips 57A and 57B provide a lifting point for the user getting in and out of the assistive mobility device.

In a preferred embodiment of the invention, the lower sections 132A and 132B (see FIG. 10) of the telescoping anti torque posts 35A and 35B have the smaller diameter and slide inside the larger diameter sections 131A and 131B that are on top. It is known, however, that the reverse orientation could have been applied.

The length of the lower sections of the anti torque posts, 132A and 132B, is such that these posts have a considerable overlap with the front upper sections of the anti torque posts, 131A and 131B, when the device is in the collapsed position such that they will not be easily separated. Thus, a portion of the interior sections 132A and 132B are always contained within the upper outer sections 131A and 131B. For the first time in the art of rolling chairs this telescoping system makes it possible to maintain casters in alignment during use and still have a collapsible chair closing simultaneously in the X and Y direction.

Another improvement is the addition of flexible armrest supports 115A and 115B that are attached hand grips 57A and 57B and to the backrest supports 30A and 30B. The length of the upper anti torque posts 131A and 131B is determined by the desired height of the hand grips 57A and 57B. By well known means one end of the armrests 115A and 115B are attached to hand grips 57A and 57B and the opposite end to the backrest posts 30A and 30B.

Figure 11:
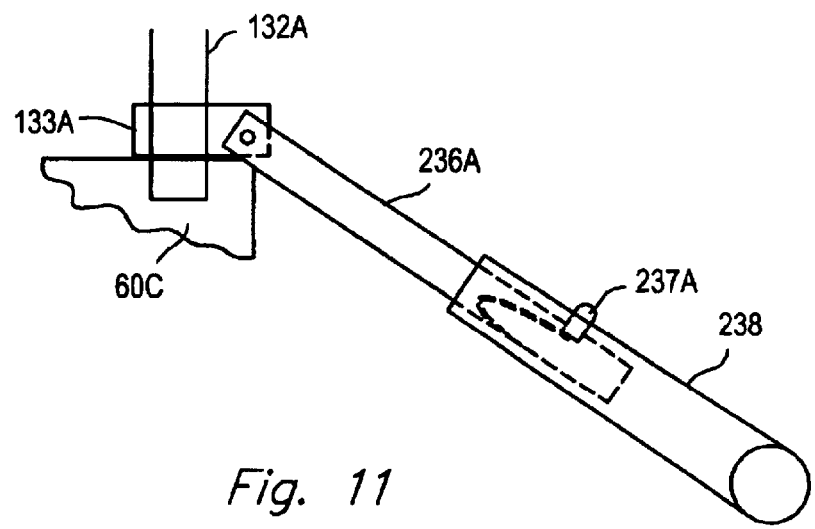
FIG. 11 is a side view of a telescoping detachable footrest.

In yet another improvement, as more fully described below in reference to FIGS. 11 and 12. The armrest height can be made adjustable by incorporating a locking mechanism into the telescoping lower sections, 132A and 132B of the anti torque posts and/or the upper anti torque posts, 131A and 131B, such that said hand grips can be locked in one or more positions above what would have been their normal position without such a mechanism.

Previously we described a footrest, 38 (FIGS. 3 and 3A) which was collapsible, telescoping and hinged in five locations 36A, 368, 36C, 36D, and 36F. Although the footrest described is removable, it was anticipated that it would remain attached to the mobility device when opened and collapsed by folding. The operation would occur through a series of hinges and swivel fittings such that the various components of the footrest, 37A and 37B, and 34 would all end up being aligned with the support arms in the closed position and in a usable configuration when the chair was in open position. The closing movements included two sections of cross bar 34 moving to a parallel position during closing at hinge 36E as the support arms are pushed together. Simultaneously, hinges 36C and 36D would also start to rotate their sides connected to 34 coming together. In addition, attachment arms 37A and 37B and the side portion of the footrest 3B would drop from the near horizontal plane to a near vertical plane parallel to the to the support arms while the collapsing cross bar also moved to a near vertical plane. Thus creating a series of supports all about parallel to each other and to the frame cross support arms.

In addition, there are two alternate methods for providing a footrest that are user friendly while allowing the mobility device to fold in both the X and Y directions and yet not creating a tripping hazard. One method (not shown) is to attach a footrest mounting bracket to the front support posts, 50E and 50F (FIG. 1), near or at their point of intersection. A detachable vertical footrest support arm is attached to the footrest mounting bracket and a near horizontal arm is swivelly attached to the lower end of the vertical arm. Thus, the vertical and near horizontal supports can collapse to a parallel position when closed either when either attached to the mobility device or detached. To increase the strength of the fitting, one or two straps may be used to connect the top of the horizontal arm with the unconnected end of the near horizontal arm.

A detachable footrest is mounted on the non-swivel end of the near horizontal footrest support arm. Possible mounting mechanisms include but are not limited to sliding on, pinning, or other means for quick attachment.

In another preferred embodiment of the footrest, two footrest mounting brackets 133A and 133B (see FIG. 10) are attached above the lower front corner brackets 60C and 60D. Two footrest swivel arms 236A and 236B (FIG. 11) are connected by a swivel means to the footrest mounting brackets 133A and 133B. The footrest swivel arms 236A and 236B comprise one side of a telescoping assembly having a push button looking mechanism 239A and 239B that retain the other side of the telescoping assembly, of the detachable footrest 238.

Figure 12:
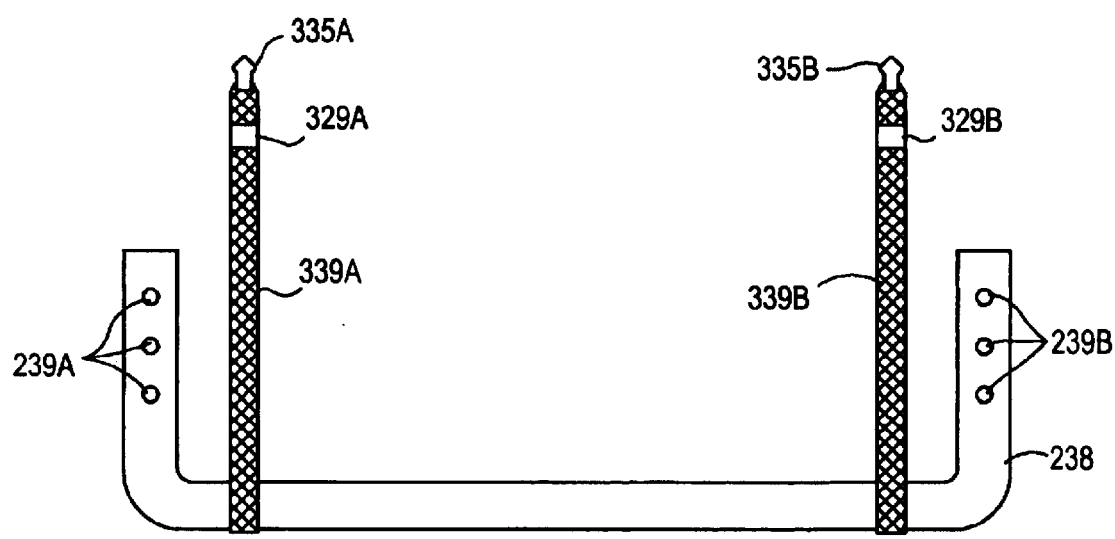
FIG. 12 is a front view of a detachable footrest with support straps.

FIG. 12 illustrates the footrest 238 that telescopically slides onto the footrest swivel arms 236A and 236B and holes 237A and 237B that provide for adjustable length when the footrest is attached. FIG. 12 also shows, two adjustable length straps 339A and 339B that have the bottom half of quick connect buckles 335A and 335B attached to one of their ends and their other ends attached to the footrest 238 near its outside corners. The length of belts 339A and 339B is adjusted by slide locks 329A and 329B which provide for the shortening dr lengthening of the belts. Two additional belts 111A and 111B (FIG. 13) have the upper half of quick connect buckles 335A and 335B attached to one of their ends and the other ends are attached to the front of the seat 100 (FIG. 13). Said upper and lower halves of seat buckles 335A and 335B connect to each other. This design provides for the footrest to be removed when the assistive device is folded, to be lowered to a near vertical position when the user is entering or exiting the assistive device thus avoiding tripping and falling hazards, and to be adjusted in length and height during use.

One means for providing structural rigidity is a seat 100 that also has a unified back. This is illustrated in FIGS. 3 and 13, as a method of interconnecting the upper corner brackets 40A, 40B, 40C and 40D. The seat and backrest 100 can also be separated as two individual units, however, in either case the key structural element of the seat is its attachment at the upper corner brackets 40A and, 40B, 40C and 40D. Securing the seat 100 at these four points provides a mechanical means for preventing the collapse of the chair frame structure beyond the intended size dictated by the seat 100. The seat 100 is constructed of a flexible material in order that the mobile chair can be collapsed and of a strong material with reinforced attachment points such that it can withstand the increased forces previous described.

Alternatively, a web or belt (not shown) could be used to interconnect the perimeter of upper corner brackets 40A and, 40B, 40C and 40D or the perimeter of lower corner brackets 60A, 60B, 60C and 60D for structural strength and a non structure bearing seat likewise attached.

The push bar 20 (FIG. 13) is attached by a quick connect means in order that it can be quickly connected and disconnected prior to the unfolding and folding operations. Because the push bar 20 is used to both lift, tilt and push the mobility device it must be strongly connected to the backrest posts 30A and 30B. The quick connect fittings 220A and 220B are located near the upper end of the back rest support posts 30A and 30B and are positioned such that the push bar ends 21A and 21B slide vertically down into the quick connect fittings 220A and 220B. In the preferred embodiment of the invention the quick connect fitting is a cam lock connection.

Figure 13A:
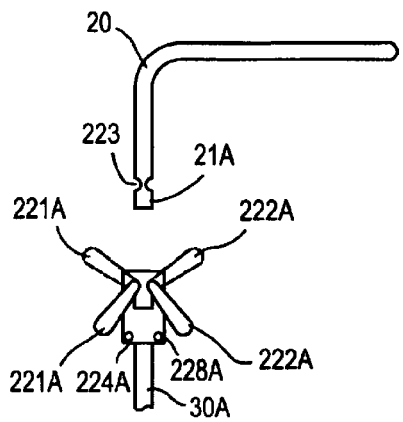
FIG. 13A is a detailed view of the push bar cam lock connector.
Figure 13:
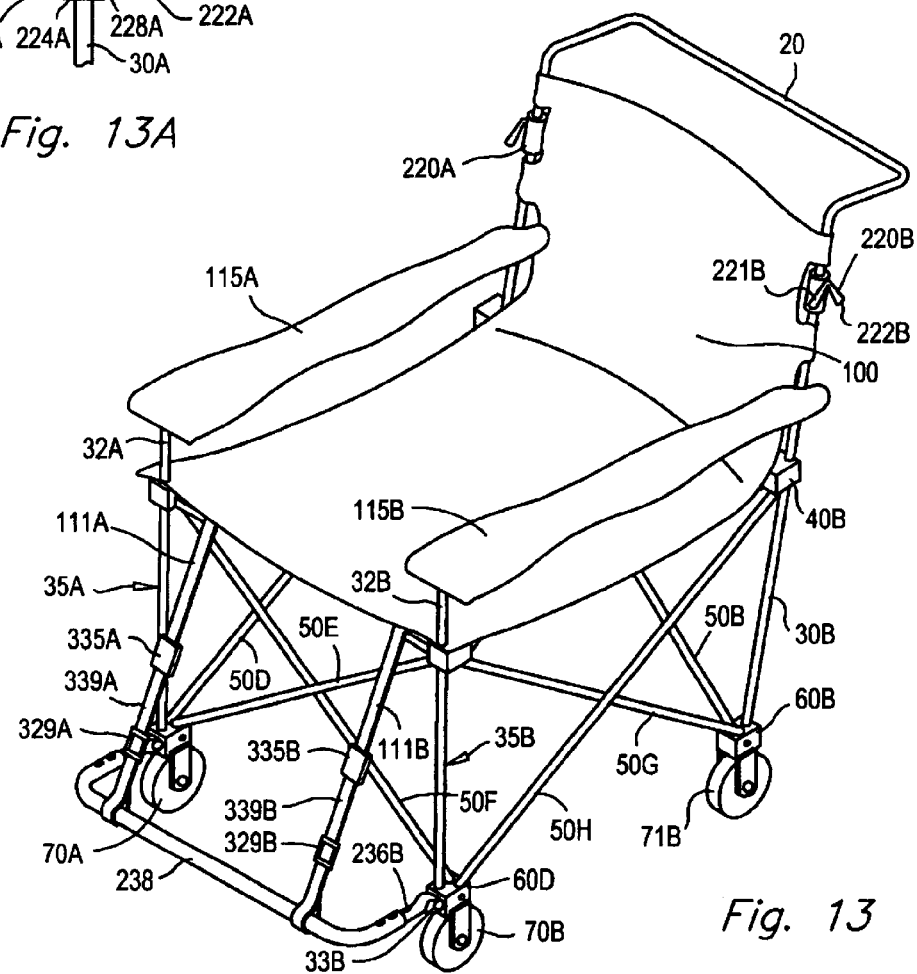
FIG. 13 is a perspective view of a mobility device with anti torque arms, footrest, and arm rests.

FIG. 13A illustrates how the push bar 20 is installed into the quick connect fittings 220A and 220B that are attached to the top of backrest posts 30A and 30B by rivets 228A and (228B not shown). The two push bar ends 21A and 21B are inserted into the quick connect fixture bodies 224A and 224B. The cam lock arms 221A and 222A and 221B and 222B are attached to the quick connect fixture bodies by pins 225 that allow the arms to rotated from a near upward pointing direction to a near downward point direct. As the cam lock arms 221A and 222A and 221B and 222B are lowered, the gap between the quick connect fixture bodies 222A and 222B and the push bar ends 21A and 21B is closed by the cams located at the pinned ends of the cam lock arms 221A and 222A and 221B and 222B and frictional pressure is applied to the push bar ends 21A and 21B, thus locking them in place. To remove the push bar the process is reversed.

In a preferred embodiment, groves 223 or similar detents are incorporated into the push bar ends 21A and 21B at their point of intersection with the cam lock arms 221A and 222A and 221B and 222B to insure a non blip fitting.

Other looking mechanisms such as locking pins which slide through a locking fixtures and push bar ends 21A and 21B, (not shown) or a twist frictional grips (not shown) can be used to secure the push bar 20 to the backrest posts 30A and 30B.

The push bar quick connect fittings 220A and 220B are located on posts 30A and 30B at a height approximately five inches below the total height of the device. Thus creating a push bar 20 with approximately a six inch vertical rise and approximately a six inch horizontal extension. This height was chosen to keep the folded height of the mobility device to a minimum while creating a push bar that would fit within the carrying case for the device without increasing the overall size of the carrying case or bag by more than the diameter of the push bar 20. Alternatively, locations for the quick connect fixtures 224A and 224B are possible and could include but are not limited to an elbow fixture at the top of the backrest posts (not shown) or horizontally mounted quick connect fixture (not shown).

It is also recognized that the push bar may be replaced by a pair of collapsible or removable handles. One collapsible version of said handles would se to construct them in a way that would allow them to be rotated 90 degrees when the mobility device was collapsed (not shown). A second method of construction would be to attach them with a quick connect fitting similar to those previously described. The handles would be thus removed during collapse and reinstalled for use in the open position.

Figure 7:
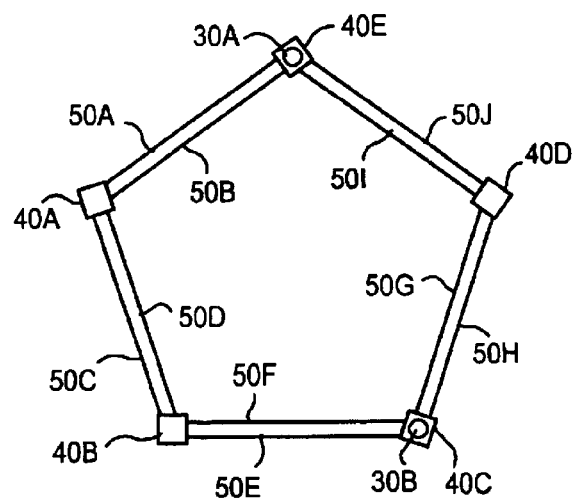
FIG. 7 is a top view of a five-sided office chair frame using the assistive mobility device frame and caster invention concept. The chair is shown without a seat and back means.
Figure 8:
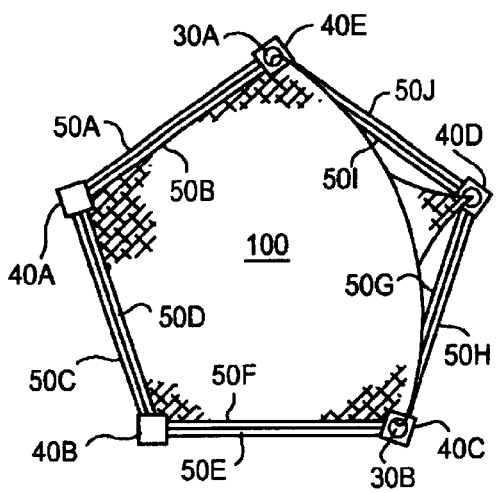
FIG. 8 is a top view of a five-sided office chair frame with a seat and back means.

In yet another embodiment of the previously described invention, the handle bars or push bars 20 are removed from the backrest supports 30A and 30B thus creating a chair which now fulfills the function of a collapsible, rolling office chair as shown in FIG. 7. To match current office industry design practices and improved the chairs stability in the office environment an additional set of seat crossed support arms 50I and 50J and the associated corner brackets 40E and (60E not shown) and a fifth caster are added to make a five-sided frame. A top view of the five-sided frame is illustrated in FIG. 7. The five sided frame also collapses in a similar operation to form a very compact unit for storage. The back rest is supported by posts 30A and 30B as illustrated in FIG. 8. The office chair can, however, be made with a point of the chair being centered in the front of the seat (not illustrated). As with the assistive mobility device, arm rests (not shown) can be added to the device in a similar manor.

Figure 14:
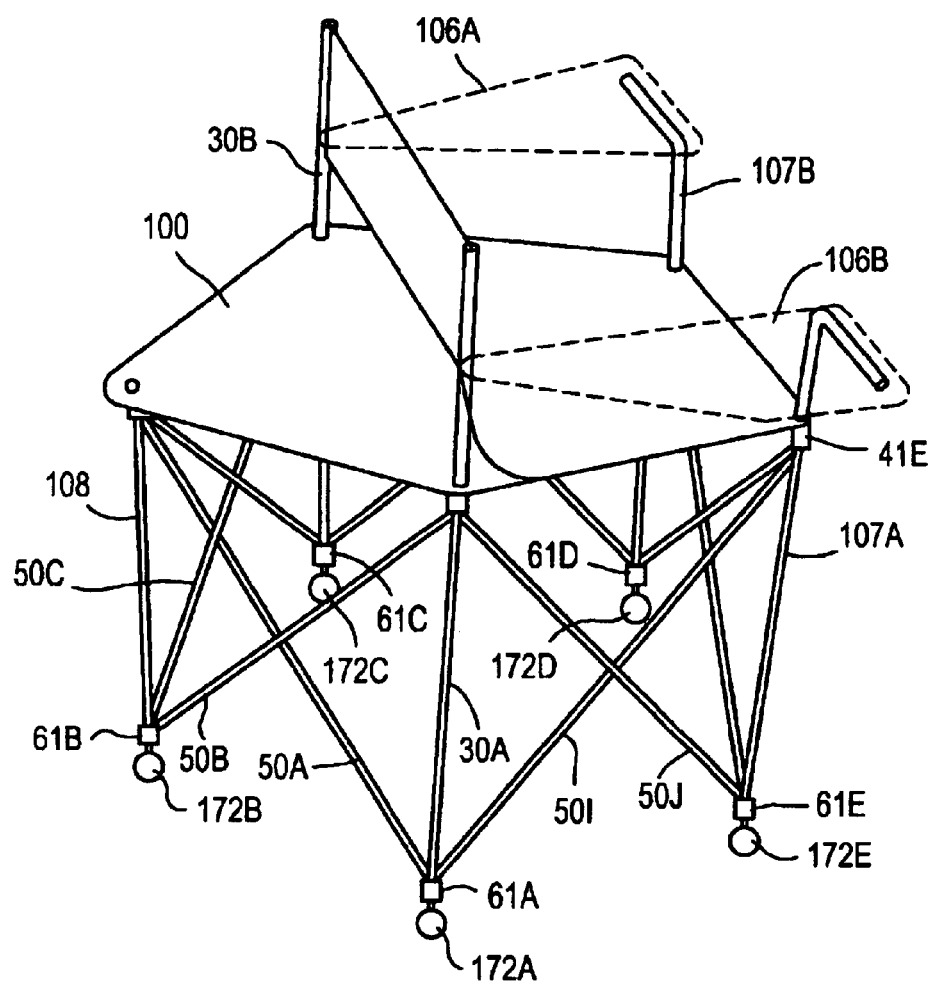
FIG. 14 perspective view of a collapsible five-sided chair with casters.

FIG. 14 is a perspective view of a preferred embodiment of an equal angled five-sided chair frame previously illustrated in FIG. 8. Although the chair is illustrated with casters they are not required because the chair's lower corner brackets 61A, 61B, 61C, 61D and 61E, can be used to interface with the ground or other surface upon which the chair rests. The casters 172A, 172B, 172C, 172D, and 172E, are attached below the lower brackets 61A, 61B, 61C, 61D and 61E. All ten support crossed arms 50A, 50B, 50C, 50D, 50E, 50F, 50G, 50H, 50I, and 50J, two per side are pivotally connected at their midpoint and equal in length. Said support arms are swivelly connected to upper brackets 41A, 41B, 41C, 41D, and 41E and lower brackets 61A, 61B, 61C, 61D and 61E like those of the mobility device. Thus, the chair can be opened and closed in a manner similar to that of the previously described mobility device.

FIG. 14 also illustrates the five vertical members, two backrest posts 30A and 30B connected to lower brackets 61A and 61C and passing through upper brackets 41A and 41C, and three telescoping anti torque posts 107A 107B, and 108. Posts 107A and 107B are similar in construction and function to those described for the mobility device's anti torque posts 35A and 35B, shown in FIG. 10. These anti torque post are connected to lower brackets 61D and 61E and slidably pass through upper brackets 41D and 41E and also serve as hand grips and attachment points for armrests 106A and 106B (shown as dotted lines). The telescoping rear anti torque bar 108 is connected to lower bracket 61B and upper bracket 41B. FIG. 14 also illustrates a unified seat and back 100. The seat is attached at or two the five upper brackets 41A, 41B, 41C, 41D, and 41E.

We believe the chair illustrated in FIG. 14 will be use as a computer chair. The shape of the chair with its wide back and a narrower front lends itself to armrests that are ergonomically positioned to support the arms in a natural and comfortable position. The broad front portion of the armrests can be configured to hold a computer mouse pad while the outward direction of the back will provide full support for the user's arms to rest in a relaxed and untensioned state. The wide back also provides additional comfort for the larger occupant. The five-sided design also prevents the occupant from rocking backwards and tipping over which is a significant safety feature versus a four-sided chair. The chair design also provides a shelf behind the seat for storage of books and papers.

Figure 15:
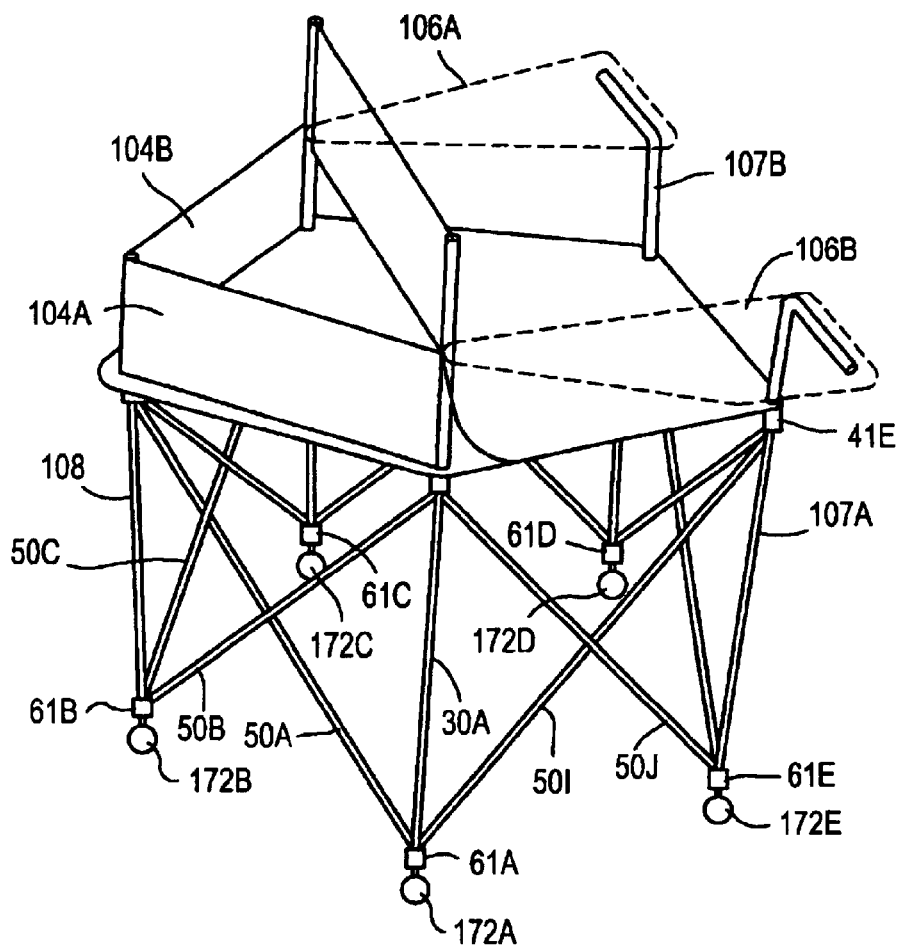
FIG. 15 is a perspective view of a collapsible five-sided chair with raised rear storage area.

FIG. 15 illustrates yet another version of an equal angled five-sided chair design wherein storage space behind the seat 100 has raised sides around the space behind the seat back. The storage area might be used for books, reference papers or supplies. The storage area is created by extending the anti torque bar 108 through upper bracket 41B and adding additional fabric to create sides 104A and 104B. Said sides are attached to backrest support arms 30A and 30B and the anti torque bar 108.

Figure 16:
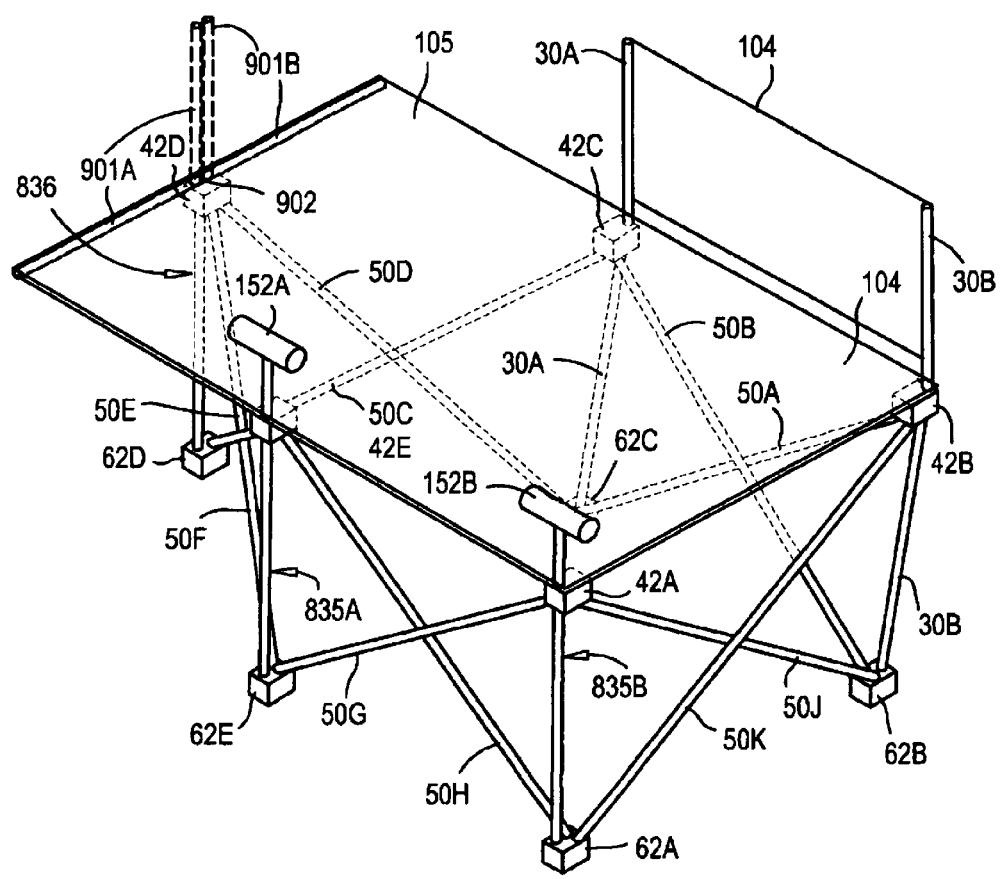
FIG. 16 is a perspective view of a collapsible five-sided chair forming a conventional four-sided chair with a side table.

In yet another version of the collapsible five-sided chair is illustrated in FIG. 16. The chair is comprised of two adjacent corners defined by upper and lower corner brackets 42A and 62A whose two pair of attached crossed support arms 50G and 50H and 50I and 50J form a 90 degree internal angle and by upper and lower corner brackets 42B and 62B whose two pair of attached crossed support arms 50A and 50B and 50I and 50J form a 90 degree internal angle; and the two corners adjacent to the 90 degree angle corners defined by upper and lower corner brackets 42C and 62C whose two pair of attached crossed support arms 50A and 50B and 50C and 50D form a 150 degree internal angle and 42E and 62E whose two pair of attached crossed support arms 50E and 50F and 50G and 50H form a 150 degree internal angle; and the fifth corner adjacent to the two 150 degree angled corners defined by upper and lower corner brackets 42D and 62D having a 60 degree internal angle. Using this configuration we create a conventional appearing chair with a side table attached as illustrated in FIG. 17.

Although the five-sided chair frame chair is illustrated in FIG. 17 without casters they may be added below the chair's lower corner brackets 62A, 62B, 62C, 62D and 62E. Two per side, crossed support arms 50A and 50B, 50C and 50D, 50E and 50F, 50G and 50H, and 50I and 50J, are pivotally connected at their mid points and equal in length. Said support arms are connected to upper brackets 42A, 42B, 42C, 42D, and 42E and lower brackets 62A, 62B, 62C, 62D and 62E in a manor similar to that of the mobility device.

FIG. 16 also illustrates five vertical members, two backrest posts 30A and 30B connected to lower brackets 62B and 62C and passing slidably through upper brackets 42B and 42C; two optional if casters are not attached telescoping anti torque posts 835A and 835B (that are similar in construction and function to those described for the mobility device 35A and 35B shown in FIG. 10.) that are connected to lower brackets 62A and 62E and slidably pass through upper brackets 42A and 42E; and an optional if casters are not attached telescoping table support anti torque bar 836 connected to the lower corner bracket 62D and the upper corner bracket 42D. Hand grips 152A and 152B are mounted on the upper ends of the telescoping anti torque posts 835A and 835B to assist the user in and out of the chair. As a further embodiment, two flexible collapsible armrests may be attached at the hand grips 152A and 152B and to the vertical backrest posts 30A and 30B.

A seat 100 and backrest 104 are used to hold the chair in its desired open configuration in a manner similar to that already described for the mobility device. It is also note that a unified seat and backrest may also be used to achieve the structural and seating means.

A collapsible triangular shaped surface side table (not shown) can be created by stretching a flexible fabric covering over the area bounded by upper corner brackets 42C, 42D and 42E create. FIG. 16 illustrates a preferred embodiment of the collapsible side table wherein two hinged extension arms 901A and 901B are attached to the upper corner bracket 42E. The extension arms 901A and 901B fold from a horizontal open position to a vertical closed position as illustrated. When in the open position, the extension arms 901A and 901B form a line parallel to a line drawn between upper corner brackets 42C and 42E and in the same horizontal plane as the upper corner brackets. A flexible fabric 105 is attached to the outer ends of extension arms 901A and 901B and to the upper corner brackets 42C and 42E to create a rectangular side table area in the open position.

A six-sided chair with two side table is made by duplicating the side table illustrated in FIG. 17 as a mirror image on the opposite side of the chair through the addition of an extra pair of corner brackets and crossed support arms. Thus a chair having both a left and right side table is created to provide additional storage or working space.

In the case of five-sided chair illustrated in FIG. 16 and the six-sided chair (not illustrated) the flexible table tops have been separated from the seat means to insure any distortion that might occur though application of weight to the seat means is not reflected in the table surface. The alternative does, however, exist to make the seat and table means unified.

It recognized that it may be desirable to reinforce the structure of the five and six sided chairs to accommodate heavier users. This can be done by the addition of interior crossed support arms. For example, an additional bet of support arms might be installed between upper and lower corner brackets 42C and 62C and 42E and 62E in the five-sided chair illustrated in FIG. 16.

From the foregoing, it will be seen that the invention is well adapted to accomplish all of the ends and objectives herein and above set forth, together with other advantages which are obvious and inherent to the apparatus and structure. It will be understood that certain features and subcombinations are of utility and may be employed without reference to other features and subcombinations. This is contemplated by and is within the scope of the claims. Because many possible embodiments may be made of the invention without departing from the scope hereof, it is to be understood that all matters set forth and shown in accompanied drawings are to be interpreted as illustrative only and not to in a limiting sense.

What is claimed is:

1. A collapsible chair frame assembly on wheels comprising:
   i. four frame sides, a front side, a left side, a right side and a back side, each side comprising two pivotally connected intersecting support members per side:
   ii. said frame assembly including a number of upper corner brackets and a number of lower corner brackets, wherein the number of upper corner brackets is equal to the number of sides and the number of lower corner brackets is equal to the number of sides:
   iii. one end of each support member is connected to a lower corner bracket and another end of each support member is connected to an upper corner bracket, wherein a lower end of each support member is connected to a lower corner bracket that also connects a lower end of the adjacent support member and an upper end of each support member is connected to an upper corner bracket that also connects an upper end of the adjacent support member,
   iv. said frame further comprising a pair of rear backrest support posts, each backrest support post having an upper end and a bottom end, wherein a bottom end of one post is connected to a backside lower corner bracket and a bottom end of another post is connected to another backside lower corner bracket, each of said backrest support posts slidably passing through an upper backside corner bracket in vertical alignment with said backrest support post: said backrest support post having the mechanical strength required to permit lifting or tilting the front or back of the chair off the ground in order to change elevation or avoid obstructions to forward or backward movement,
   v. a means connected to said backrest support posts having the mechanical strength for pushing or pulling the chair while occupied, and for lifting the rear wheels off the ground or tilting the front wheels off the ground in order to change elevation or avoid obstructions to forward or backward movement, said means being either rapidly removable or collapsible with the upper ends of the backrest support posts, and a lock that locks the lifting means to the frame,
   vi. a caster wheel mounted below and attached to every lower corner bracket with at least two caster wheels with freedom to rotate 360 degrees in the horizontal plane,
   vii. telescoping anti-torque posts mounted on each lower front corner bracket, said telescoping anti-torque posts extending vertically from the lower brackets to or through a vertically aligned upper front corner bracket, whereby a collapsible wheeled chair frame assembly is formed.

2. The invention of claim 1 including adjustable backrest means for a backrest support.

3. The invention of claim 2 wherein said adjustable backrest support comprises telescoping sections inserted above the point of crossed intersection into the upper portion of the back side members on each of the side crossed members that connect to the upper rear corner brackets, and means for locking said telescoping sections in selectable positions in order to provide for selectable backrest adjustment.

4. The invention of claim 1 wherein the frame includes a seat and backrest means attached to the frame for supporting a person in a sitting position.

5. The invention of claim 1 wherein the frame includes a footrest means.

6. The invention of claim 1 wherein the frame includes an armrest means attached to the frame to support a person's arms while seated.

7. A four-sided collapsible chair frame assembly on wheels comprising:
   i. four frame sides each comprising two pivotally connected intersecting support members per side;
   ii. said frame assembly including a front side, a left side, a right side, and a back side,
   iii. said frame assembly including four upper brackets and four lower brackets;
   iv. one end of each support member is connected to a lower bracket and another end of each support member is connected to an upper bracket, wherein the lower end of each support member is connected to a lower bracket that also connects a lower end of the adjacent support member and an upper end of each support member is connected to an upper bracket that also connects an upper end of the adjacent support member,
   v. one caster wheel mounted below and attached to each of the lower brackets on the front or back side of the frame
   vi. two telescoping anti-torque posts, each attached to a lower front bracket and each extending vertically from the its front lower corner brackets slideably passing through an upper front bracket in vertical alignment,
   vii. means mounted on the upper end of each telescoping anti-torque post to prevent the front brackets from sliding over the upper ends of the telescoping anti-torque posts and for initiation of the telescoping action within the anti-torque posts required during opening and closing,
   viii. two backrest support posts, each extending vertically from a lower back side corner bracket and sliding through a vertically aligned upper back corner bracket; whereby a collapsible four-sided wheeled chair frame is formed.

8. The invention of claim 7 wherein at least the two front side caster wheels or the two back side caster wheels have a means for locking the caster wheels in a stationary position.

9. The invention of claim 7 wherein the frame includes a seat and backrest means attached to the frame for supporting a person.

10. The invention of claim 7 wherein the frame includes a footrest means attached to the frame to support a persons feet.

11. The invention of claim 7 wherein the frame includes an armrest means attached to the frame to support a persons arms while seated.

12. The invention of claim 7 wherein the frame includes a means connected to said backrest support posts for pushing or pulling the chair while occupied, and for lifting the rear wheels off the ground or tilting the front wheels off the ground in order to change elevation or avoid obstructions to forward or backward movement, said means being either rapidly removable or collapsible with the upper ends of the backrest support posts.

13. A collapsible chair suitable for moving a person from one location to another location comprising:
   A. a four-sided frame, collapsible from front to back and side to side, said frame having front, back and sides; said frame including:
      a. a front side comprising a pair of front crossed support arms;
      b. a back side comprising a pair of back side crossed support arms;
      c. a left side comprising a pair of left side crossed support arms,
      d. a right side comprising a pair of right side crossed support arms
      e. each pair of said crossed support arms pivotally connected where they intersect and being of approximately equal length;
      f. wherein each crossed support arms has a lower end and an upper end; and
      g. wherein a lower end of one of the front crossed support arms and a lower end of the adjacent left side crossed support arm are connected to a left lower front corner bracket adjacent thereto; and
      h. wherein the lower end of another front crossed support arms and a lower end of the adjacent right side crossed support arm are connected to a right lower front corner bracket adjacent thereto; and
      i. wherein a lower end of one of the back crossed support arms and an adjacent lower backside end of a left side crossed support arm are connected to a lower left back corner bracket adjacent such respective ends, and
      j. wherein a lower right end of another back crossed support arm and an adjacent lower backside end of a right side crossed support arm are connected to a right lower back corner bracket adjacent such respective ends, and
      k. wherein an upper left end of a back crossed support arm and the upper left back end of a side crossed support arm are connected to an upper left back corner bracket adjacent such respective ends; and
      l. wherein an upper right ends of a back crossed support arm and an upper right back end of a side crossed support arm are connected to an upper right back corner bracket adjacent such respective ends; and
      m. wherein an upper left end of a front crossed support arm and an upper left front end of an adjacent left side crossed support arm are connected to an upper left front corner bracket adjacent such respective ends,
      n. wherein an upper right end of a front crossed support arm and an upper right front end of an adjacent right side crossed support arm are connected to an upper right front corner bracket adjacent such respective ends.
   B. said chair further comprising a pair of rear backrest support posts, each backrest support post having an upper end and a bottom end, wherein a bottom end of the first post is connected to left lower rear corner bracket and another backrest support post is connected to a right lower rear corner bracket; each of said backrest support posts slidably passing through an upper back corner bracket in vertical alignment with said backrest support post; said backrest support posts having the strength required to permit lifting the front or back of the chair off the ground in order to change elevation or avoid obstructions to movement, C. said chair further comprising right and left telescoping anti-torque posts, each having an upper section and a lower section, with one section slidably telescoping within the other; and wherein the right post is supported by said right front corner bracket and the left post is supported by said left front corner bracket; said posts being maintained in vertical alignment by said brackets, and each of said posts slidably passing through an upper corner bracket in vertical alignment with said post;

D. means mounted on the upper end of each telescoping anti-torque post to prevent the front upper corner brackets from sliding over the upper ends of the telescoping anti-torque posts and for initiation of each anti-torque post's telescoping action, E. two caster wheels with freedom to rotate 360 degrees in the horizontal plane monuned below and attached to the lower brackets on the front or back side of the frame and two caster wheels with no freedom of rotation in the horizontal plane mounted below and attached to the lower brackets on the frame side opposite the freely rotating caster wheels, F. said caster wheels having locking brakes mounted on the rear wheels or mounted on the front wheels;

G. means connected to said rear backrest support posts for pushing or pulling the chair while occupied, and including the ability to lift or tilt the rear wheels or the front wheels off the ground in order to change elevation or avoid obstructions to forward or backward movement, said means being either rapidly removable or collapsible with the upper ends of the backrest support posts, and a lock that locks the lifting means to the frame, H. a footrest;

I. means for holding the frame in its open position.

14. A collapsible chair as claimed in claim 13, including a seat and backrest.

15. A seat and backrest as claimed in claim 14 wherein the seat and backrest are made of a flexible material.

16. A collapsible chair as claimed in claim 13 wherein said footrest is adjustable in both the horizontal and the vertical planes.

17. A collapsible chair as claimed in claim 16 wherein the footrest comprises a forward telescoping frame member and is collapsible or detachable.

18. A collapsible chair as claimed in claim 13 wherein hand grips are placed on the upper ends of telescoping anti-torque posts to assist the chair occupant to stand or sit.

19. A mobility collapsible chair as claimed in claim 18 wherein flexible arm rests are attached to the hand grips on the upper end of the anti-torque posts and to the backrest posts.

20. The chair as recited in claim 13, wherein the position of the backrest is adjustable.

21. The collapsible chair as recited in claim 20, including telescoping means for backrest adjustment.

22. The invention in claim 13 wherein the means for moving the chair is a push bar connected by means of a quick release fitting to the upper ends of the backrest support posts, said fittings, posts, and push bar having the strength and rigidity required to permit lifting the rear wheels off the ground or tilting the front wheels off the ground in order to change elevation or avoid obstructions to forward or backward movement.

23. The invention in claim 13 wherein the means for pushing or pulling the chair while occupied is a pair of collapsible handles having the strength and rigidity required to permit lifting the rear wheels off the ground or tilting the front wheels off the ground in order to change elevation or avoid obstructions to forward or backward movement.

24. A folding chair comprising:
   a. frame comprised of a pair of front crossed support arm; a pair of back crossed support arms; and two pairs of side crossed support arms; each pair of crossed support arms pivotally connected together where they cross;
   b. a lower end of each of the front crossed support arms and an adjacent lower front end of a side crossed support arm pivotally connected to first and second lower, front corner brackets;
   c. a lower end of each of the back crossed support arms and a lower, back end of an adjacent side support arm pivotally connected to first and second lower, back corner brackets;
   d. an upper end of each of the back cross support arms and an adjacent upper back end of a side cross support arm pivotally connected to first and second upper, back corner brackets;
   e. an upper end of each of the front crossed side support arms and an adjacent upper front end of a side cross support arm pivotally connected to first and second upper, front corner brackets;
   f. a pair of rear backrest support posts, each having an upper end and a bottom end, a bottom of each post being connected to the lower rear bracket in vertical alignment with said post; each of said posts slidably passing through the upper bracket in vertical alignment with said post;
   g. adjustable backrest means comprising telescoping sections inserted above the point of crossed intersection into the upper portion of the rear side support arms on each of the side crossed support arms that connect to the upper rear corner brackets, and means for locking said telescoping sections in selectable positions in order to provide for selectable backrest adjustment.

25. A multiple sided collapsible chair frame assembly on wheels comprising:
   i. at least four frame sides each comprising two pivotally connected intersecting support members per side;
   ii. said frame assembly including upper brackets equal to the number of sides and lower brackets equal to the number of sides;
   iii. said frame assembly including at least a front side and a back side,
   iv. one end of each support member connected to a lower bracket and another end of each support member is connected to an upper bracket, wherein the lower end of each support member is connected to a lower bracket that also connects the lower end of the adjacent support member and the upper end of each support member is connected to an upper bracket that also connects the upper end of the adjacent support member, whereby a multiple sided collapsible connected frame is formed,
   v. a caster wheel mounted below and attached to each lower corner bracket
   vi. telescoping anti-torque posts mounted on each lower front bracket, said telescoping anti-torque posts extending vertically from lower brackets to or through a vertically aligned upper bracket,
   vii. said frame further comprising a pair of rear backrest support posts, each backrest support post having an upper end and a bottom end, wherein a bottom end of one post is connected to a backside lower corner bracket and a bottom end of another post is connected to another backside lower corner bracket, each of said backrest support posts slidably passing through an upper backside corner bracket in vertical alignment with said backrest support post: said backrest support post having the mechanical strength required to permit lifting or tilting the front or back of the chair off the ground in order to change elevation or avoid obstructions to forward or backward movement, viii. a means connected to said backrest support posts and having the mechanical strength for pushing or pulling the chair while occupied, and for lifting the rear wheels off the ground or tilting the front wheels off the ground in order to change elevation or avoid obstructions to forward or backward movement, said means being either rapidly removable or collapsible with the upper ends of the backrest support posts, and a lock that locks the lifting means to the frame, whereby a collapsible wheeled frame is formed.

26. The invention of claim 25 including means attached to the upper ends of telescoping anti-torque posts to prevent the upper front brackets from sliding past the upper ends of the telescoping anti-torque post and for initiation of telescoping separation action.

* * * * *